United States Patent [19]

Francis

[11] Patent Number: 4,674,999
[45] Date of Patent: Jun. 23, 1987

[54] METHOD OF FORMING A PLASTIC FILM CONSTRUCTION

[75] Inventor: Michael A. Francis, Mechanicsville, Va.

[73] Assignee: Ethyl Corporation, Richmond, Va.

[21] Appl. No.: 735,655

[22] Filed: May 20, 1985

Related U.S. Application Data

[63] Continuation of Ser. No. 423,955, Sep. 27, 1982, abandoned.

[51] Int. Cl.⁴ .............................................. B31F 1/00
[52] U.S. Cl. .................................... 493/356; 493/462
[58] Field of Search ............... 53/118, 391, 429, 430, 53/567, 390; 206/389, 390, 494; 242/1, 55; 493/198, 244, 462, 356; 52/3-5

[56] References Cited

U.S. PATENT DOCUMENTS

| | | | |
|---|---|---|---|
| 2,006,511 | 7/1935 | Parsons | 53/529 |
| 2,068,167 | 1/1937 | Dwight | 206/494 |
| 2,362,771 | 11/1944 | Remington et al. | 493/437 |
| 2,553,923 | 5/1951 | Lambert | 242/1 |
| 2,666,840 | 1/1954 | Poirier | 52/3 X |
| 2,801,018 | 7/1957 | Yount | 206/389 X |
| 4,231,210 | 11/1980 | Nagode | 53/397 |
| 4,483,127 | 11/1984 | Forkner | 53/390 X |

FOREIGN PATENT DOCUMENTS 495665 of 1954 Italy ...................................... 53/429

Primary Examiner—Robert L. Spruill
Assistant Examiner—Steven P. Weihrouch
Attorney, Agent, or Firm—Donald L. Johnson; John F. Sieberth; Paul H. Leonard

[57] ABSTRACT

A method of folding large sheets of tubular plastic film or slit tubular plastic film wherein the longitudinal edges of the plastic film are folded back over a surface of the film about 180° to an imaginary longitudinal line drawn substantially through the center of a surface of the film and then forming the so-folded sheet into a roll and a roll of greenhouse film folded in the foregoing manner.

6 Claims, 6 Drawing Figures

METHOD OF FORMING A PLASTIC FILM CONSTRUCTION

This application is a continuation of application Ser. No. 423,955, filed Sept. 27, 1982 now abandoned.

BACKGROUND OF THE INVENTION

The present invention is in the field of plastic film and especially in the field of films packaged in relatively large rolls.

The invention is particularly related to that film generally referred to as greenhouse film.

Greenhouse film is a type of plastic film made for covering greenhouses or other similar type hot houses used in growing plants and the like. Such film is customarily packaged in large rolls. The film comes in various gauges, but usually has a thickness of about four mils up to six mils. The film ranges in widths from about 10 feet to 50 feet with lengths running from about 50 feet to about 500 feet. Smaller or larger sizes of course, can be made, but are generally not desirable for most commercial uses.

Packaging of film of such gauge, length and width requires a certain amount of folding and rolling to enable the film to be placed in a standard commercial box. The large rolls of film can be difficult to handle and especially when a workman is endeavoring to install same on the roof of a greenhouse.

Greenhouse film is manufactured as an elongated relatively flat tube of a predetermined width and length as well as guage. Sometimes, as circumstances dictate, the film is slit longitudinally on one side so that it might be opened into a single flat sheet of about double the width of the tube.

In packaging greenhouse film, two types of folds have been predominant. One is called a double-fold construction and the other is called a gussetted construction. In the former, a tube of film is folded lengthwise so that one edge is folded over so as to be adjacent the other edge. The film is similarly folded if it has been slit. After folding, the film is rolled into a cylindrically shaped object as is well known in the film rolling art.

In the gussetted construction, each edge of the film is folded inwardly toward the center so as to form a somewhat bellows type tube. The slit film is folded in substantially the same manner. After gussetting, the film is formed into the usual cylindrical roll.

The double-fold construction provides an asymmetrical package. The gussetted construction results in four additional hard folds in the film, which are generally undesirable. This latter type of fold construction also has a tendency to "block".

It is therefore a primary object of the present invention to provide a fold construction for plastic film which is symmetrical.

Another object of the invention is to provide a fold construction for plastic film which does not have hard folds and wherein there is less tendency to "block" since the film is cooled before folding.

Still another object of the instant invention is to provide a package of greenhouse film which permits an installer of the film to center a roll of film on the apex of a roof, unroll the film the length of the greenhouse and then unfold the film to its full width down each side of the greenhouse.

SUMMARY OF THE INVENTION

The present invention provides a fold construction for greenhouse film, wherein a tube or slit tube of such film is folded in such a manner that each longitudinal edge of the film is folded back over a surface of the film about 180° to a point near the center of a longitudinally drawn line extending down the middle of the surface and from one end of the film to the other. The plastic film so folded is then rolled into a cylindrical roll or object.

BRIEF DESCRIPTION OF THE DRAWING

The construction designed to carry out the invention will be hereinafter described, together with other features thereof.

The invention will be more readily understood from a reading of the following specification and by reference to the accompanying drawings forming a part thereof, wherein an example of the invention is shown, and wherein:

Referring now to FIG. 1 of the drawings, the tubular film or section of greenhouse film is referred to generally at 10

The film 10 can be made from various plastics. A polyolefin film is prepared and a polyethylene film is particularly preferred. Polypropylene film is also suitable. For greenhouse use, the film has integrity from ultraviolet rays and is sufficiently thick to have adequate structural integrity for the use intended. A guage or thickness of four to six mils has been found to be satisfactory for most uses.

Figure 1:
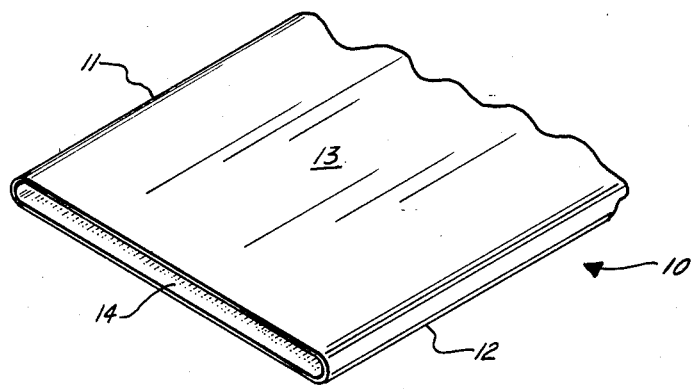
FIG. 1 is a perspective view of a tubular section of plastic film.
Figure 2:
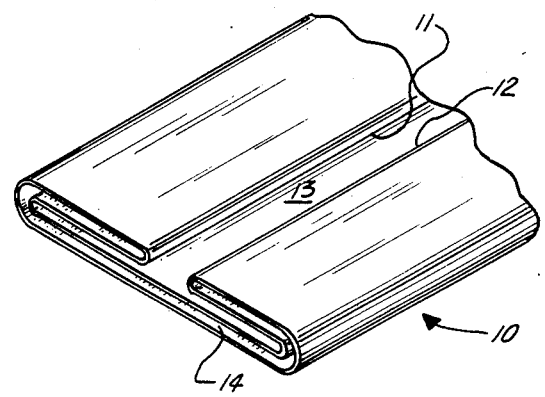
FIG. 2 is a perspective view of a section of tubular film similar to that of FIG. 1 after it has been folded in the manner of the instant invention.

The tubular section of film 10 has an edge 11 and an edge 12. The film also has a surface 13 and a surface 14. The fold construction of this invention is made as best seen in FIG. 2, by bringing the edge 11 and the edge 12 to approximately the center of the surface 13. The edge 11 is folded about 180° to a point near the center of the surface 13 or near a longitudinal line equally dividing the surface 13. The edge 12 is similarly folded back over the surface 13 and near the same center or longitudinal line to which the edge 11 is folded.

Figure 3:
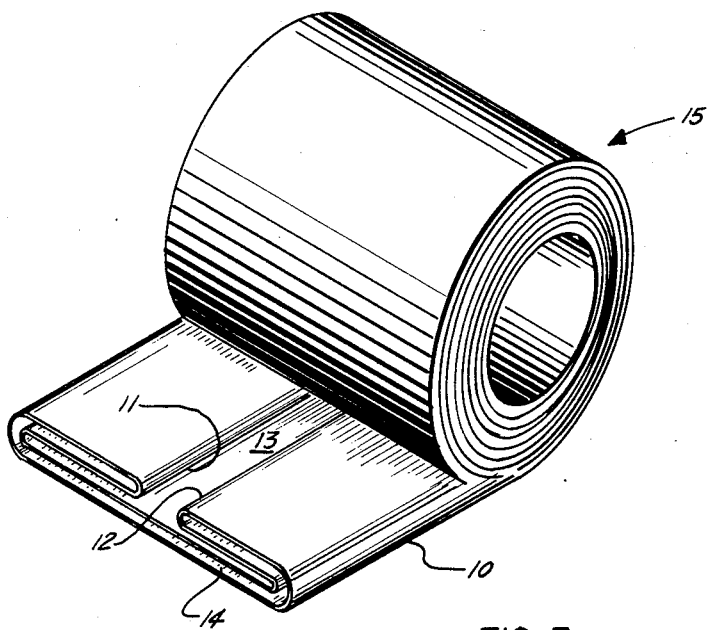
FIG. 3 is a perspective view of a roll of the tubular film of FIG. 2 illustrating the manner in which said folded film is rolled.

Once the greenhouse film is folded in the manner shown in FIG. 2, it is than rolled into a roll or cylindrically shaped object 15 as seen in FIG. 3. When completely rolled up, the roll 15 can easily be packaged in a rectangularly shaped box or other suitably shaped container.

Figure 4:
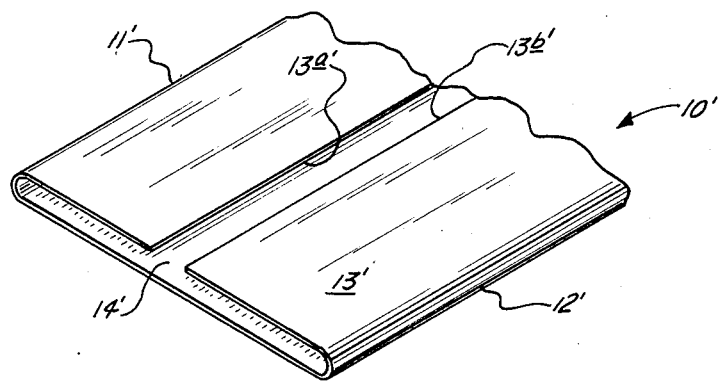
FIG. 4 is a perspective view of a section of tubular film that has been slit.
Figure 5:
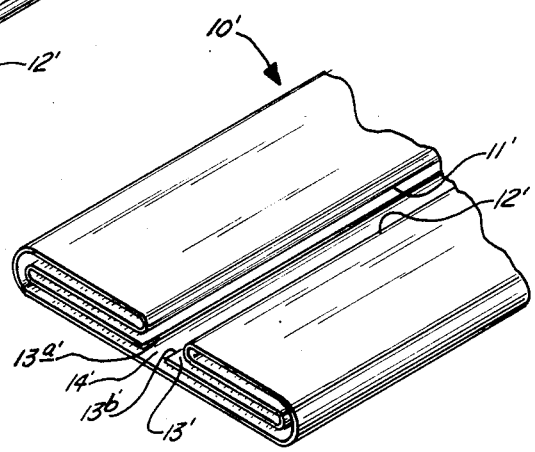
FIG. 5 is a perspective view of a section of slit tubular film after it has been folded in the manner of the present invention.
Figure 6:
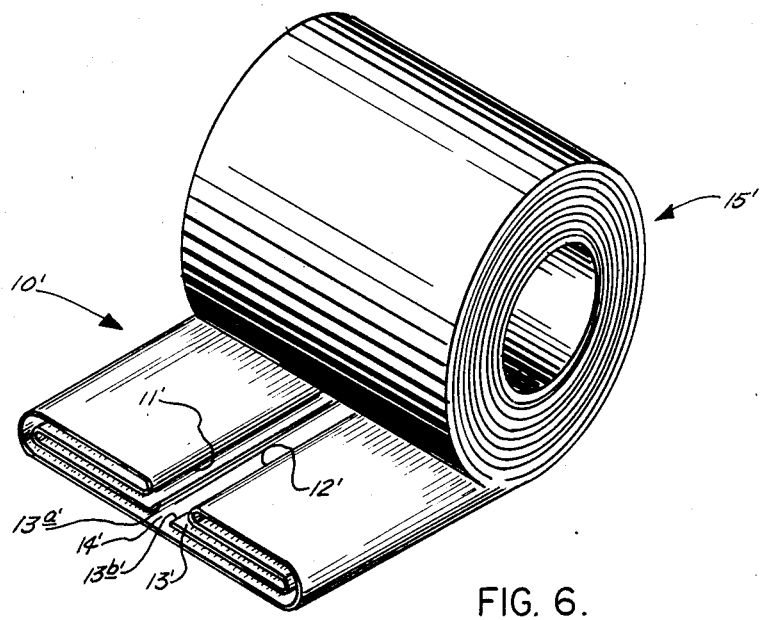
FIG. 6 is a perspective view of a roll of the slit tubular film of FIG. 5 illustrating the manner in which said folded film is rolled.

Referring now to FIGS. 4–6, an alternate type of fold is disclosed. A section of tubular film 10' having edges 11' and 12' and surfaces 13' and 14' has the surface 13' slit longitudinally the length of the film section or sheet 10' substantially along a line drawn through the center of the surface 13'. The slit provides longitudinal edges 13a' and 13b'.

After the greenhouse film or sheet 10' is folded in the manner as seen in FIG. 5, the sheet 10, is then rolled into a or cylindrically shaped object 15' as seen in FIG. 6. As in the case of the roll 15, the roll 15' when completely rolled up can easily be packaged in a suitable container.

The symmetrical packaging arrangement or fold construction of the instant invention enables an installer of greenhouse covering to quickly and easily install a film covering on a greenhouse.

In the present invention, hot or freshly made film is cooled before folding thereby reducing splitting and blocking.

It can readily be appreciated that the fold construction of this invention can be utilized with a wide variety of types of sheet materials or plastic film.

The foregoing disclosure and description of the invention is illustrative and explanatory thereof and various changes in the illustrated process may be made within the scope of the appended claims without departing from the spirit of the invention.

What is claimed is:

1. A method of folding a large sheet of flattened tubular plastic film, comprising the steps of longitudinally slitting a surface of said large sheet the length thereof whereby said surface of said large sheet is divided substantially into two equal halves, folding over the longitudinal edges of the large sheet of said flattened tubular plastic film about 180° to the longitudinal slit of said one surface of said large sheet of said slit tubular plastic fil, and then rolling the so-folded large sheet of said flattened tubular plastic film into a cylindrically shaped object or roll, thereby providing a roll of plastic film which may be centered at the apex of a greenhouse, unrolled and then unfolded to the full width of the plastic film down each side of the greenhouse and substantially cover the greenhouse.

2. The method of claim 1, wherein said large sheet of flattened tubular plastic film is an extruded plastic film.

3. The method of claim 21, wherein said large sheet of flattened tubular plastic film is a polyolefin film.

4. The method of claim 21, wherein said large sheet of flattened tubular plastic film is polyethylene film or polypropylene film.

5. The method of claim 21, wherein said plastic film has a sheet thickness of about four to six mils.

6. The method of claim 21, wherein said plastic film has a flattened width ranging from about 10 feet to 50 feet.

* * * * *

UNITED STATES PATENT AND TRADEMARK OFFICE
CERTIFICATE OF CORRECTION

PATENT NO. : 4,674,999
DATED : JUNE 23, 1987
INVENTOR(S) : MICHAEL A. FRANCIS

It is certified that error appears in the above-identified patent and that said Letters Patent is hereby corrected as shown below:

Column 2, line 40 reads "at 10" and should read -- at 10. --.

Column 3, line 6 reads "a or" and should read -- a roll or --.

Column 4, line 7 reads "fil" and should read -- film --.

Column 4, line 16 reads "21" and should read -- 1 --.

Column 4, line 18 reads "21" and should read -- 1 --.

Column 4, line 21 reads "21" and should read -- 1 --.

Column 4, line 23 reads "21" and should read -- 1 --.

Signed and Sealed this

Tenth Day of November, 1987

Attest:

DONALD J. QUIGG

Attesting Officer

Commissioner of Patents and Trademarks